United States Patent [19]

Suzuki et al.

[11] 4,316,947
[45] * Feb. 23, 1982

[54] CADMIUM SULFIDE FOR ELECTROPHOTOGRAPHY

[75] Inventors: Kiyoshi Suzuki, Yokohama; Hirokuni Kawashima, Tokyo, both of Japan

[73] Assignee: Canon Kabushiki Kaisha, Tokyo, Japan

[*] Notice: The portion of the term of this patent subsequent to Apr. 8, 1997, has been disclaimed.

[21] Appl. No.: 184,752

[22] Filed: Sep. 8, 1980

[30] Foreign Application Priority Data

Sep. 13, 1979 [JP] Japan .................. 54-117779

[51] Int. Cl.$^3$ .................. G03G 5/08; G03G 5/087
[52] U.S. Cl. .................. 430/94; 430/95; 430/136; 252/501.1; 423/561 B; 423/566
[58] Field of Search .................. 430/94, 95, 136; 252/501.1; 423/561 B, 566

[56] References Cited

U.S. PATENT DOCUMENTS 4,197,122 9/1980 Kawashima et al. .................. 430/94

FOREIGN PATENT DOCUMENTS

| | | |
|---|---|---|
| 632340 | 12/1961 | Canada . |
| 44-14695 | 6/1969 | Japan . |
| 47-32513 | 8/1972 | Japan . |
| 1028469 | 5/1966 | United Kingdom . |
| 1071062 | 6/1967 | United Kingdom . |
| 1215685 | 12/1970 | United Kingdom . |
| 1245712 | 9/1971 | United Kingdom . |

OTHER PUBLICATIONS

Frerichs, "The Photoproductivity of Incomplete Phosphors", Phys. Rev., vol. 72, #7, Oct. 1947, pp. 594-601.
Mimura, Jap. Jour. of Appl. Phys., vol. 12, #5, May 1973, pp. 661-669.

*Primary Examiner*—Roland E. Martin, Jr.
*Attorney, Agent, or Firm*—Fitzpatrick, Cella, Harper & Scinto

[57] ABSTRACT

Cadium sulfide for electrophotography is produced by reacting hydrogen sulfide with a solution containing cadmium sulfate, sulfuric acid and hydrochloric acid of a low concentration, and then firing the resulting cadmium sulfide without adding a donor impurity other than that derived from the hydrochloric acid.

3 Claims, No Drawings

CADMIUM SULFIDE FOR ELECTROPHOTOGRAPHY

BACKGROUND OF THE INVENTION

1. Field of the Invention

The present invention relates to a cadmium sulfide for electrophotography, and more particularly, to a cadmium sulfide produced from starting materials containing hydrochloric acid.

2. Description of the Prior Art

Heretofore, cadmium sulfide for electrophotography has been prepared by passing hydrogen sulfide gas through a solution containing a water soluble cadmium salt such as cadmium sulfate and precipitating cadmium sulfide. The resulting cadmium sulfide particles do not contain any donor and acceptor impurities and is a raw material for preparing photoconductive cadmium sulfide particles for electrophotography. The cadmium sulfide is usually fired together with $CuCl_2$ as an activator and a halogen compound such as $CdCl_2$, $ZnCl_2$ and the like as a flux at elevated temperatures and the impurity is dispersed in the cadmium sulfide particles to activate the particles and thus there is produced a photoconductive cadmium sulfide suitable for electrophotography.

Another prior art process for preparing cadmium sulfide is that disclosed in Japanese Patent Publication No. 14098/1977 where hydrogen sulfide is introduced into a solution containing cadmium ions and impurity element ions to produce cadmium sulfide containing impurities. The impurities can be dispersed in the cadmium particles when fired without adding a flux since impurities are already present therein, and there is obtained a sensitized cadmium sulfide for electrophotography. In particular, according to this process, dispersion of impurities can be effectively conducted upon firing due to the preliminary presence of impurities in cadmium sulfide and unnecessarily large particle size of cadmium sulfide does not form because of the absence of fluxes.

However, cadmium sulfide produced by the prior art processes exhibits disadvantageously a somewhat slow light response. This disadvantage was not a problem, but is now a problem since copying machines are required to be of high speed and a small size. For the purpose of making a photosensitive drum suitable for such copying machines, a seamless photosensitive drum or a small-sized photosensitive drum is adopted. Therefore, taking up one portion of the photosensitive drum, it will be understood that the time interval between formation of a first latent image and that of a second latent image is shortened. When a drum prepared by using a conventional cadmium sulfide is applied to the copying machines, latent images formed in the preceding cycle still remains upon forming latent images in the present cycle and therefore both the preceding pattern and the present pattern overlap and appear simultaneously, so-called "memory phenomenon".

U.S. Pat. No. 4,197,122 discloses a process for preparing cadmium sulfide of high humidity resistance and high sensitivity which comprises precipitating cadmium sulfide in a reaction solution in the presence of hydrochloric acid of a low concentration.

According to the present invention, the process of said U.S. Patent is utilized to provide a cadmium sulfide for electrophotography free from memory phenomenon.

SUMMARY OF THE INVENTION

An object of the present invention is to provide a cadmium sulfide for electrophotographic photosensitive material suitable for high speed copying machines.

Another object of the present invention is to provide a cadmium sulfide for electrophotography free from memory phenomenon.

According to the present invention, there is provided cadmium sulfide for electrophotography which is produced by reacting hydrogen sulfide with a solution containing cadmium sulfate, sulfuric acid and hydrochloric acid of a low concentration, and then firing the resulting cadmium sulfide without adding a donor impurity other than that derived from the hydrochloric acid.

DESCRIPTION OF THE PREFERRED EMBODIMENTS

A process for producing a highly pure cadmium sulfide may be represented by the following formula.

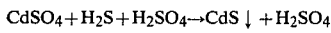

$$CdSO_4 + H_2S + H_2SO_4 \rightarrow CdS \downarrow + H_2SO_4$$

According to the present invention, the cadmium sulfide is produced following the above reaction and in addition, hydrochloric acid of a concentration lower than that of sulfuric acid is added to the reaction system and any donor impurity other than that derived from the hydrochloric acid is not added.

Hydrogen sulfide is blown into a solution containing cadmium sulfate, sulfuric acid, and hydrochloric acid to produce cadmium sulfide. The reaction proceeds as shown below:

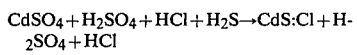

$$CdSO_4 + H_2SO_4 + HCl + H_2S \rightarrow CdS:Cl + H_2SO_4 + HCl$$

The hydrochloric acid in the starting materials not only serves as a donor source for the formed cadmium sulfide, but affects formation of cadmium sulfide nucleus upon the reaction with hydrogen sulfide depending upon the relative concentration with sulfuric acid, growing of cadmium sulfide particles subsequent to the formation of the nucleus, and thereby affects surface shape, particle size of cadmium sulfide precipitating by the reaction and finally electrophotographic properties of the cadmium sulfide.

It is necessary to select the concentration of cadmium sulfate in the starting materials mainly depending upon reaction efficiency. The concentration is preferably 0.3–1.0 mole/l.

Concentration of sulfuric acid considerably affects the resulting particle size of cadmium sulfide. Taking the final particle size, preferably 1–5 microns, of cadmium sulfide into consideration, the concentration of 1.5–3.0 ON is preferable.

Concentration of hydrochloric acid is preferably 0.05 N–0.5 N, more preferably 0.1 N–0.3 N. When the concentration is too low, the effect of hydrochloric acid is a little when it is too high, the particle size of the resulting CdS particles becomes so large that CdS particles of desirable properties can not be obtained.

A donor impurity with which the cadmium sulfide particles are to be doped is supplied by the hydrochloric acid in the starting materials.

Acceptor impurities are preferably elements of Group I of the Periodic Table such as copper, silver, gold and the like. Doping can be effected by using a compound of such element. The acceptor impurity may be added to the reaction solution to coprecipitate with cadmium sulfide or may be added to and uniformly mixed with cadmium sulfide upon firing and fired to dope the cadmium sulfide.

Cadmium sulfide precipitated in the reaction is sufficiently washed with a pure water to remove excess impurities and then filtered and dried. The cadmium sulfide thus treated is fired without adding a flux of others, if desired, by adding an acceptor impurity to dope completely the cadmium sulfide with donor and acceptor if any impurities.

The firing temperature may be optionally set. It is usually 400°–550° C., preferably 430°–480° C. The resulting cadmium sulfide is washed with water again until the specific conductivity of the washing becomes less than 10 $\mu$s/cm, and then filtered and dried at a relatively low temperature.

The invention will be explained more fully by the following examples.

EXAMPLE 1

Hydrogen sulfide was introduced, at a flow that rate of 1 liter per min. for 30 min., into 2 liters of an aqueous solution of cadmium sulfate 1 mole, copper sulfate $4 \times 10^{-4}$ mole, and sulfuric acid and hydrochloric acid in such amount that the aqueous solution contains 2 N sulfuric acid and 0.5 N hydrochloric acid, kept at 60° C.

Cadmium sulfide thus produced was washed with a pure water to remove excess impurities from the surface of the particles, filtered and dried one night at 100° C. The cadmium sulfide thus dried was heated at 450° C. for 120 min., and then washed with water until specific conductivity of the washings become 1 $\mu$s/cm and filtered followed by drying one night at 70° C.

The cadmium sulfide thus treated and a copolymer of vinyl chloride and vinyl acetate as a binder were coated on a circular drum in the thickness of 40 microns by a soaking method to form a photosensitive layer, and further, an insulating resin was coated on the photosensitive layer in the thickness of 30 microns by the same soaking method to produce a photosensitive member.

The photosensitive member was used in a copying machine where a process fundamentally comprising preliminary blanket exposure (this exposure is conducted so as to enhance injection of electric charge from the support upon electrostatic charging), positively charging, imagewise exposure simultaneously with discharging and blanket exposure was carried out at a process speed of 190 mm/sec.

The light response was so rapid that the formed latent images completely disappeared before the next cycle of copying, and therefore, good image quality was obtained free from any preceding latent images.

The above procedures were followed to produce cadmium sulfide except that $10 \times 10^{-4}$ mole/mole of CdS of $In_2(SO_4)_3$ or $Al_2(SO_4)_3$ or $Ga_2(SO_4)_3$ was additionally incorporated to the cadmium sulfate solution.

A photosensitive material produced by using the cadmium sulfide was repeatedly subjected to the above mentioned electrophotographic process, and it was observed that latent images formed in the preceding cycle did not disappear and good images were not obtained.

EXAMPLES 2–5

The procedure in Example 1 above was repeated by using each of the following cadmium sulfate solutions, and the photosensitive material made of the resulting cadmium sulfide exhibited a rapid light response in manner similar to that of Example 1.

EXAMPLE 2

| | |
|---|---|
| Cadmium sulfate | 1 mole |
| Sulfuric acid | 3.0N |
| Hydrochloric acid | 0.1N |
| Copper sulfate | |
| Fired at 430° C. | $4 \times 10^{-4}$ mole |

EXAMPLE 3

| | |
|---|---|
| Cadmium sulfate | 1 mole |
| Sulfuric acid | 2.2N |
| Hydrochloric acid | 0.3N |
| Copper sulfate was added upon firing at 440° C. | |

EXAMPLE 4

| | |
|---|---|
| Cadmium sulfate | 0.6 mole |
| Sulfuric acid | 2.5N |
| Hydrochloric acid | 0.3N |
| Copper sulfate | |
| Fired at 480° C. | $4 \times 10^{-4}$ mole |

EXAMPLE 5

| | |
|---|---|
| Cadmium sulfate | 2.0 moles |
| Sulfuric acid | 1.5N |
| Hydrochloric acid | 0.2N |
| Copper sulfate | |
| Fired at 450° C. | $4 \times 10^{-4}$ mole |

What we claim is:

1. Cadmium sulfide for electrophotography which is produced by reacting hydrogen sulfide with a solution containing cadmium sulfate, sulfuric acid and hydrochloric acid of a low concentration, and then firing the resulting cadmium sulfide without adding a donor impurity other than that derived from the hydrochloric acid.

2. Cadmium sulfide for electrophotography according to claim 1 in which an acceptor impurity is added upon the reaction with hydrogen sulfide or upon the firing.

3. Cadmium sulfide for electrophotography according to claim 2 in which the acceptor impurity is copper.

* * * * *